US012779794B2

(12) United States Patent
Purvis et al.

(10) Patent No.: US 12,779,794 B2
(45) Date of Patent: Nov. 3, 2026

(54) AFP PROCESSING SYSTEM FOR LONG MEMBERS HAVING IRREGULAR CROSS-SECTIONS

(71) Applicant: Electroimpact, Inc., Mukilteo, WA (US)

(72) Inventors: Andrew Purvis, Mukilteo, WA (US); Theodore David Goltz, Everett, WA (US); Benjamin H. Malchert, Everett, WA (US)

(73) Assignee: Electroimpact, Inc., Mukilteo, WA (US)

( * ) Notice: Subject to any disclaimer, the term of this patent is extended or adjusted under 35 U.S.C. 154(b) by 2 days.

(21) Appl. No.: 18/199,500

(22) Filed: May 19, 2023

(65) Prior Publication Data

US 2024/0383212 A1 Nov. 21, 2024

(51) Int. Cl.

*B29C 70/38* (2006.01)
*B29C 70/54* (2006.01)
*B29L 31/30* (2006.01)

(52) U.S. Cl.
CPC ............ *B29C 70/384* (2013.01); *B29C 70/54* (2013.01); *B29L 2031/3085* (2013.01)

(58) Field of Classification Search
CPC ............................. B29C 70/384; B29C 70/54; B29L 2031/3085
See application file for complete search history.

(56) References Cited

U.S. PATENT DOCUMENTS

2020/0398968 A1* 12/2020 Sjostedt ................ B29C 70/025
2021/0197501 A1* 7/2021 Ikezaki ................. B29C 53/582
2022/0242069 A1* 8/2022 Dunn ...................... B29C 70/42

* cited by examiner

*Primary Examiner* — George R Koch
*Assistant Examiner* — Christopher C Caillouet
(74) *Attorney, Agent, or Firm* — Larsen IP PLLC

(57) ABSTRACT

A support system for AFP processing of irregular members including a base assembly, first and second rotational supports, a driver for rotating the first and second rotational supports, at least one movable support for contacting and supporting the irregular member as it rotates and a control for moving the support to maintain contact with the irregular member as it is rotated, permitting AFP processing.

20 Claims, 16 Drawing Sheets

AFP PROCESSING SYSTEM FOR LONG MEMBERS HAVING IRREGULAR CROSS-SECTIONS

TECHNICAL FIELD

This invention relates generally to AFP processing systems for flexible members and more particularly concerns such processing systems for flexible members with irregular cross-sections along the lengths thereof.

BACKGROUND OF THE INVENTION

The manufacture of long, flexible elements such as, for instance, spar and strut members used in aircraft, by AFP (fiber) processing is difficult and time consuming, due to the complex shape as well as flexibility of the members. Typically, the fiber must be laid down strip by strip by hand to accommodate the shape of the member, in particular the cross-sectional configuration and flexibility of the member. AFP processing cannot be done automatically by an AFP machine for such members. During rotation of such a member with an AFP machine, the flexible member will sag at positions along its length, resulting in severe distortion, caused by the AFP machine pushing down on the member during normal AFP processing. This causes gaps and laps between successive swaths of fiber, which are typically 3.125 mm-24.4 mm wide, as the fiber is laid down. Using fixed supports for the flexible members with an irregular cross-section will not help, since as the part rotates, distortion will occur for each 90° rotation, due to the difference between the major radius and minor radius, respectively, of the flexible member. The X axis of the member axis shifts as the part rotates.

The present invention permits the use of a conventional AFP processing machine for flexible members having irregular cross-sectional shapes, significantly reducing the time required for AFP processing of such members by hand.

SUMMARY OF THE INVENTION

Accordingly, one embodiment is a support system permitting use of an AFP machine for members having an irregular cross-section, comprising: a base support member; a first rotational support assembly for an irregular member, the first end support assembly being movable along the base support member for accommodating irregular members of various lengths; a second opposing rotational support assembly for supporting an opposing end of the irregular member; a driving assembly for rotating the irregular member wherein the first and second support assemblies maintain the center axis of the part during rotation thereof; at least one support assembly for contacting and supporting the irregular member as it rotates; and a control assembly for moving the support assembly to maintain contact with the irregular member during rotation of the irregular member to permit operation of an AFP machine in placing fiber on the irregular member.

Another embodiment is a support system permitting use of an AFP processing machine for curved members, comprising: a base support assembly; a first rotational support assembly for supporting one end of the curved member; a second rotational support assembly for supporting an opposing end of the curved member, wherein at least one of the first and second rotational assemblies is movable on the base support assembly to accommodate curved members of various lengths; a driving assembly for rotating the curved member; a plurality of supporting assemblies for contacting and supporting the curved member as it rotates, wherein the supporting assemblies include a carrier member connected to the base support assembly and a post assembly movable vertically and horizontally to maintain support for the curved member as it is rotated; and a control system for controlling the movement of the post assembly, the movement depending upon the position of the carrier member along the length of the base support member, permitting the operation of an AFP machine in placing fiber on the curved member.

Still another embodiment is A support system permitting use of an AFP processing machine for wing spar members, comprising: a base support assembly; a first rotational support assembly for supporting one end of the wing spar; a second rotational support assembly for supporting an opposing end of the wing spar member, wherein at least one of the first and second rotational assemblies is movable on the base support assembly to accommodate wing spar members of various lengths; a driving assembly for rotating the wing spar member; a plurality of supporting assemblies for contacting and supporting the wing spar member as it rotates, wherein the supporting assemblies are movable vertically and longitudinally to maintain support for the wing spar member as it is rotated; and a control system for controlling the movement of the supporting assemblies, the movement depending upon the desired position of the supporting assemblies along the length of the base support member, whereon carbon fiber is placed on the spar as the spar is rotated.

BRIEF DESCRIPTION OF THE DRAWINGS

FIG. 14 is a perspective view of a wing spar member for a small aircraft or the like.

BEST MODE FOR CARRYING OUT THE INVENTION

Figure 1:
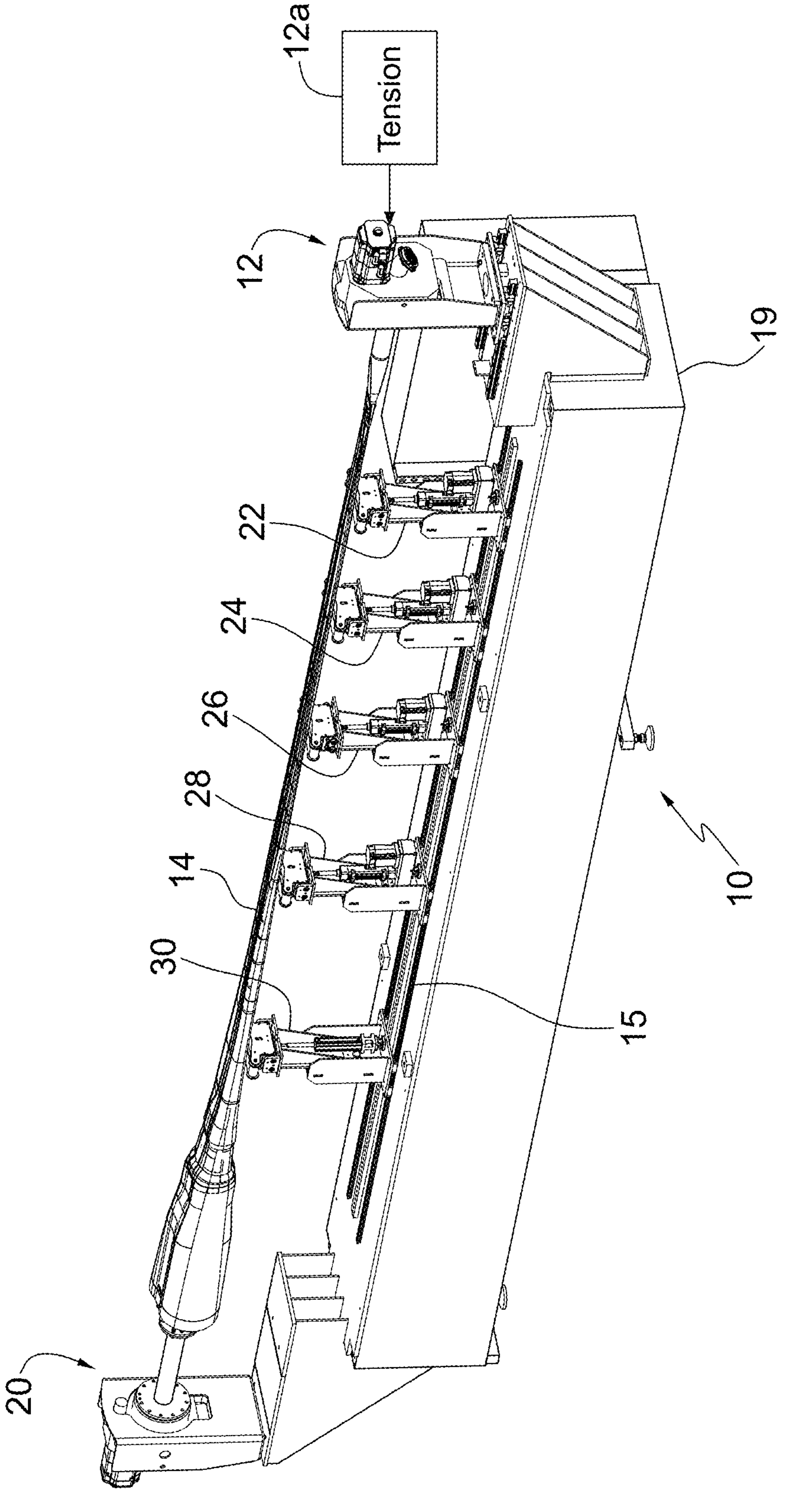
FIG. 1 is a perspective view of the system of the present invention showing member support posts positioned against a flexible member in place.

FIG. 1 shows an AFP automatic processing system for irregular cross-sectional flexible members, shown generally at 10. The system includes a tip rotator assembly 12 at one end of the system. The tip assembly 12 is adapted to receive a small diameter end of an irregular member 14. The tip assembly 12 supported for longitudinal movement to accommodate different lengths of irregular members on a linear rail 15 mounted on a support table 19. The irregular member 14 is typically thin in cross-section from the tip assembly 12 for most of its length. A tension force 12*a* is applied to the tip assembly 12, in the embodiment shown approximately 2.2 kN. The tension could be significantly higher, for example up to 9 kN.

On the other end of the processing system 10, shown in FIG. 1, is a fixed rotator assembly 20 which supports the opposing end of the irregular member 14, mounted on support table 19. As indicated above, a flexible member with an irregular cross-section will sag due to the pressure of an AFP machine pushing down on a flexible member during laying down of fiber by an automatic fiber machine. This AFP pressure in the embodiment shown is 100 N but could be much greater, with a typical range of 66 N-350 N. The rotator assemblies are supported to rotate the flexible member along a fixed longitudinal axis. In order to prevent distortion, the entire length of such a member must rotate as a solid body around a central fixed axis. The present system uses a plurality of vertically adjustable support posts along the length of the system, shown for example as five vertical support posts 22, 24, 26, 28 and 30 in FIG. 1. The number of support posts will vary depending on the configuration of the irregular member.

Figure 2:
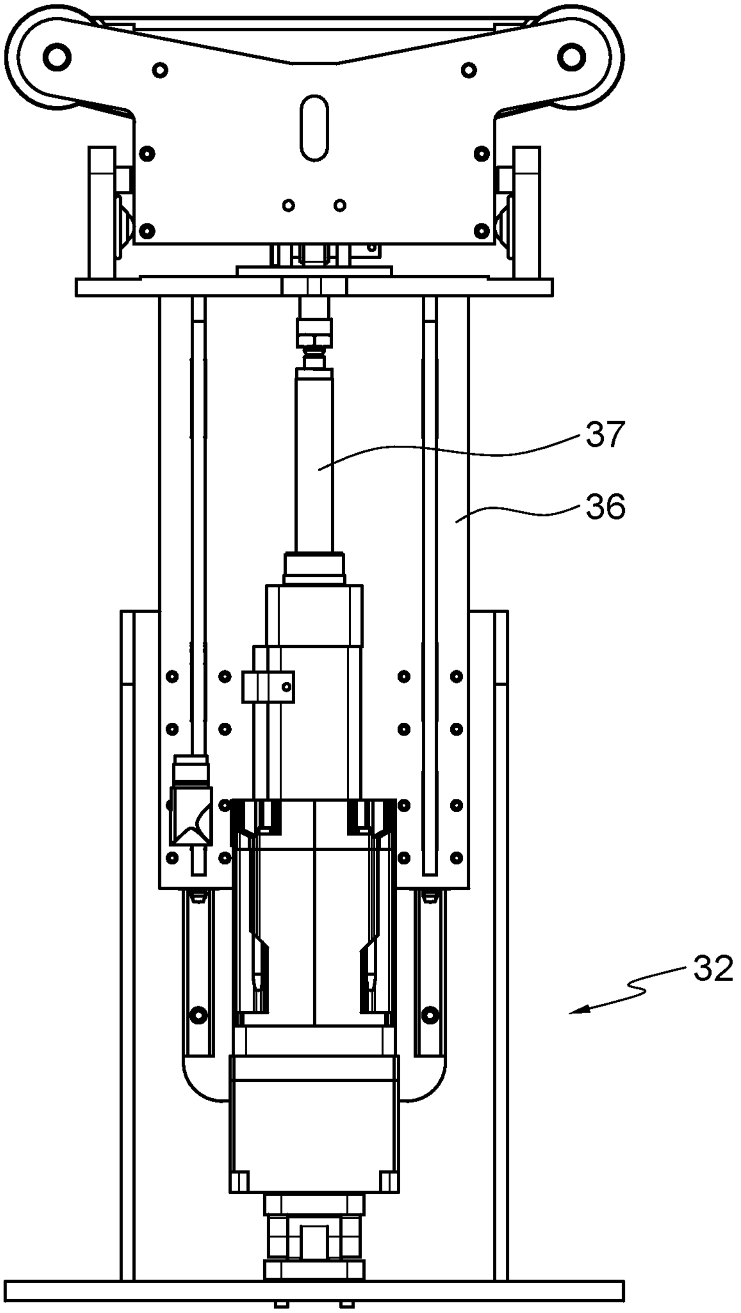
FIG. 2 is a side elevational view of a vertical position-based support post, partially cutaway.
Figure 3:
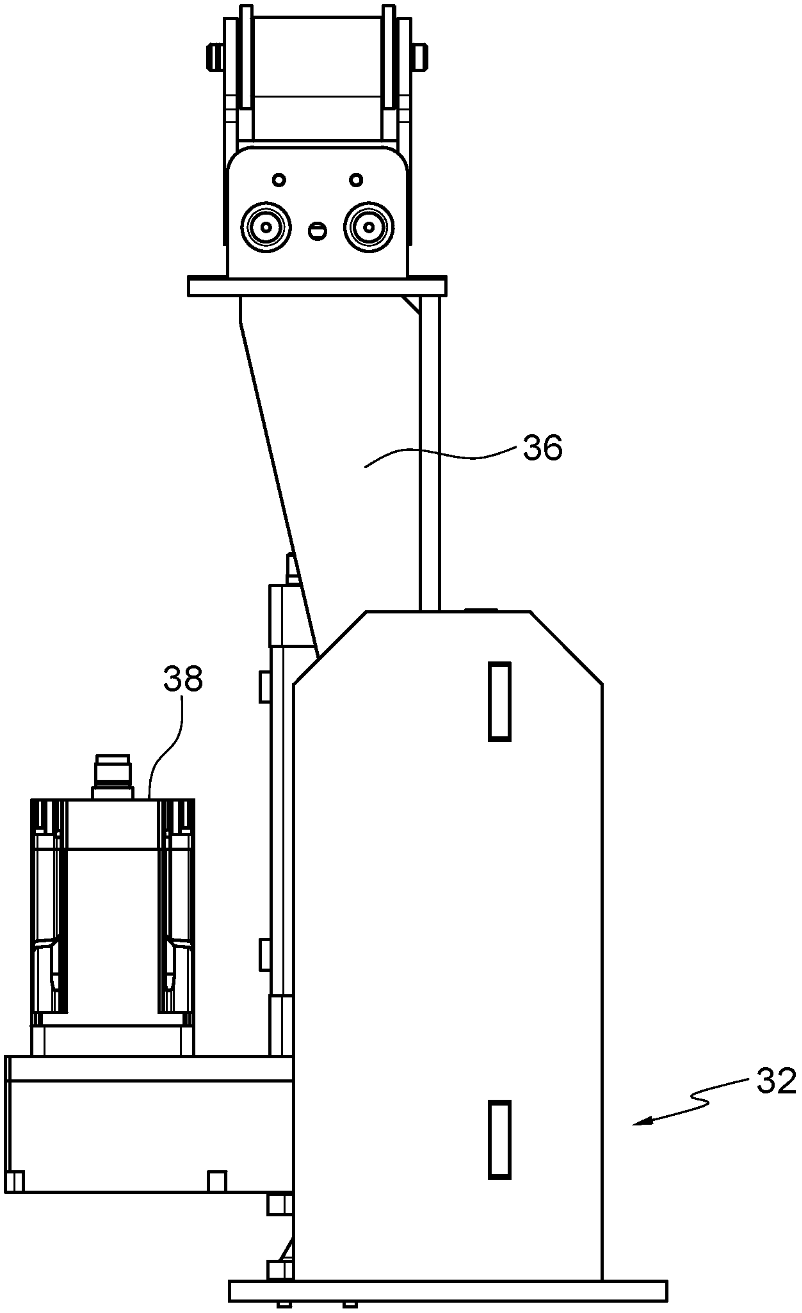
FIG. 3 is an end elevational side view of the vertical support post of FIG. 2.
Figure 4:
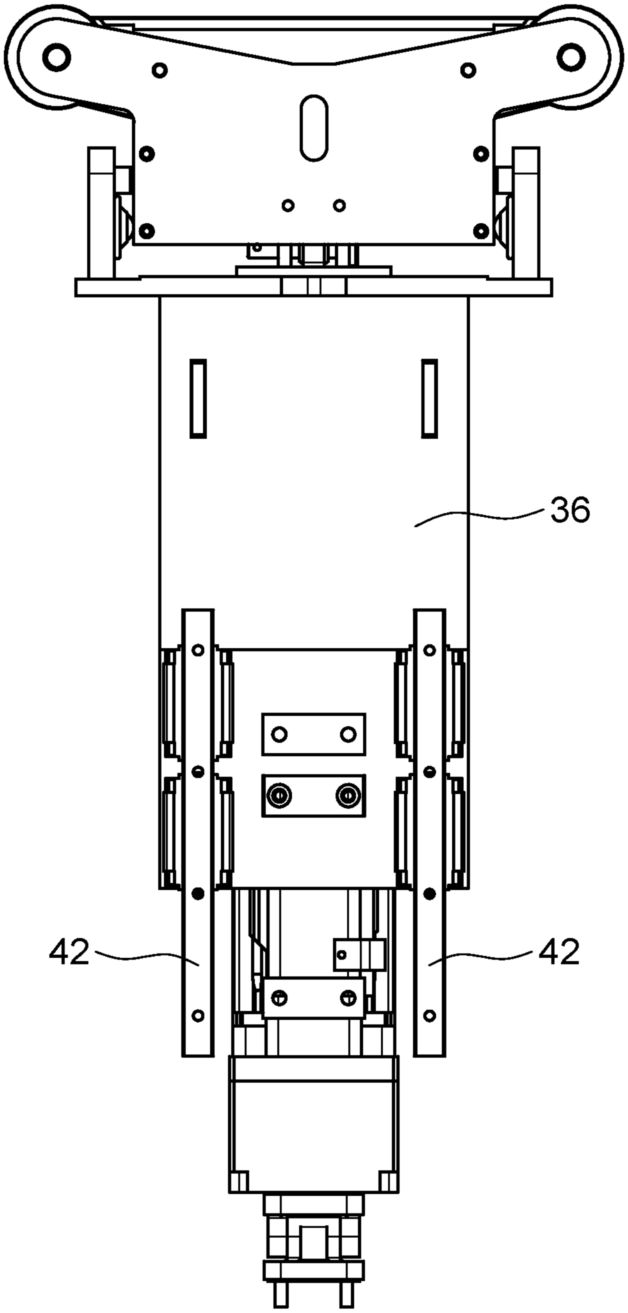
FIG. 4 is a side elevational view of the vertical support post of FIG. 2 cutaway.
Figure 5:
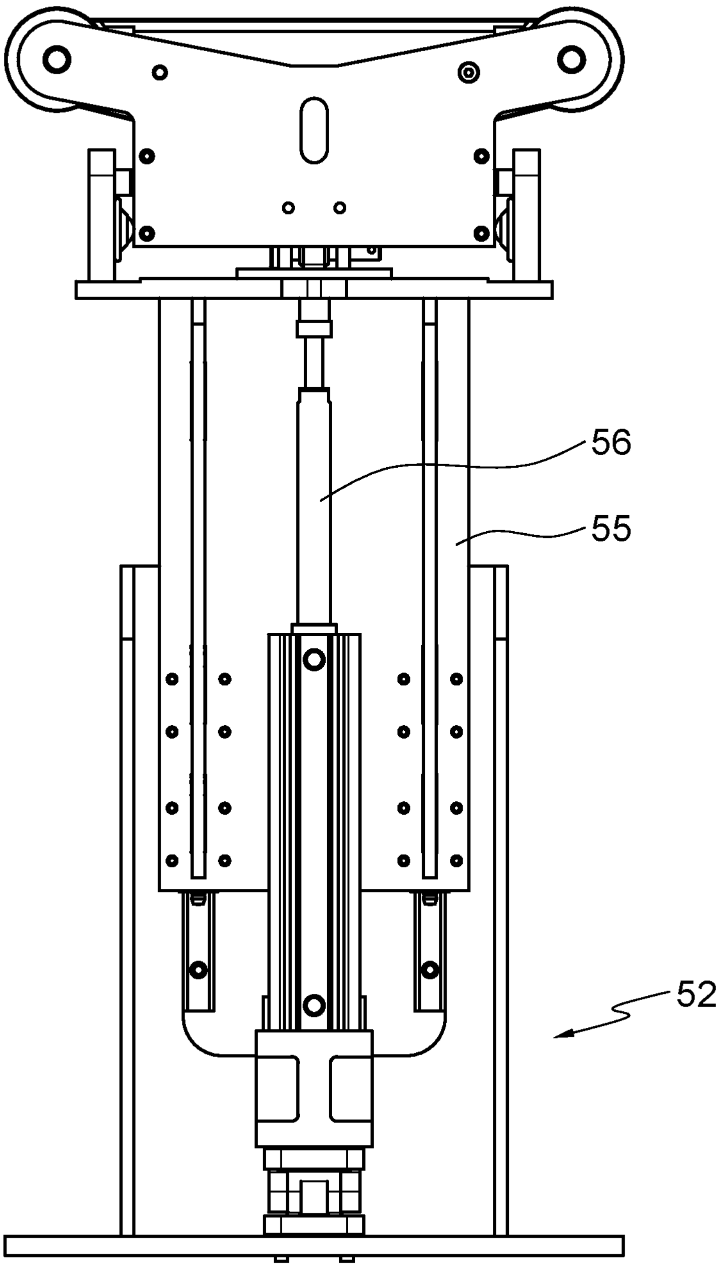
FIG. 5 is a side elevational view showing a vertical load-based support post.
Figure 6:
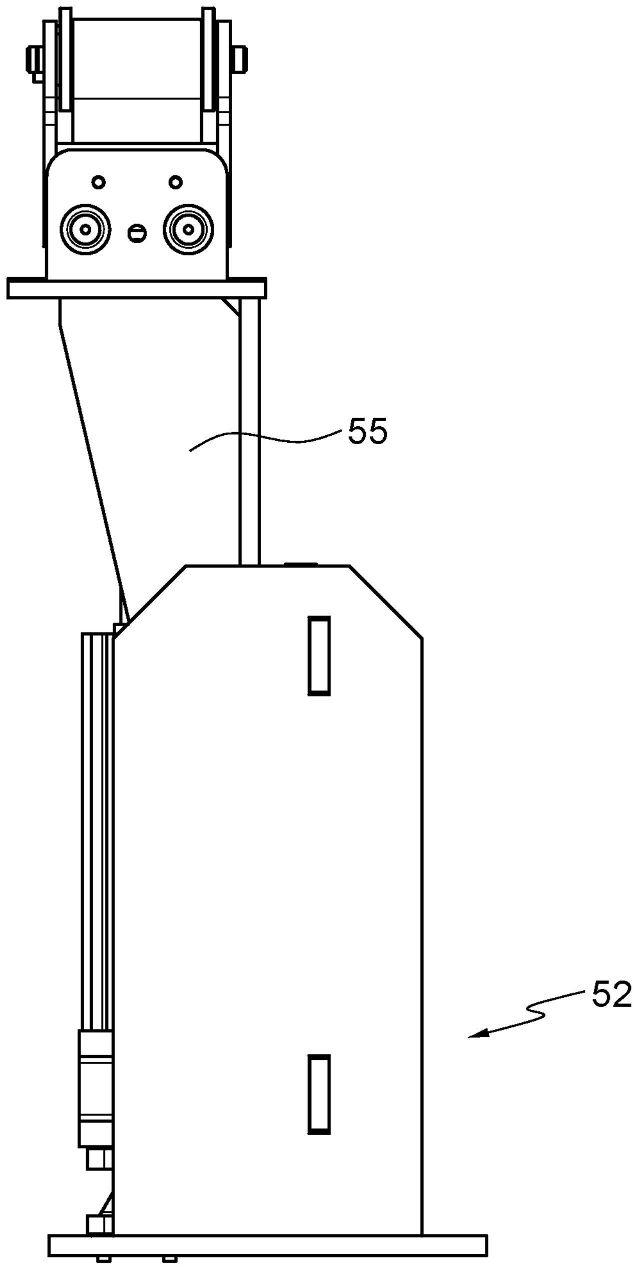
FIG. 6 is an end elevational view of the vertical support post of FIG. 5.

FIGS. 2-4 show a first embodiment of the support posts, while FIGS. 5 and 6 show a second embodiment of the support posts. The embodiment of FIGS. 2-4 refers to positioned based support posts, which include a lower portion having a post base and carriage assembly 32 and an upper guided sled member 36. The sled 36 is moved vertically by a ball screw actuator 37 controlled by a servo motor 38. The lower end includes guide rails 42 for vertical travel of the sled 36. Lower rails 15 in FIG. 1 permit the support posts to be moved longitudinally along the support table 19 to particular locations for support of the irregular member. The support posts are positioned at selected intervals along support table 19. In one embodiment, 300 mm is a distance which is sufficient to provide adequate support to limit sagging and distortion along the length of the irregular member. The sled portion is supported by bearings in the lower portion. The ball screw and the servo motors are both conventional elements, with 80 mm of travel in the embodiment shown, although this can be changed. The upper sled portion of the position-based support posts goes up and down as the part is rotated about the fixed axis of the part, in response to the rotation of the irregular member by the opposing rotator assemblies, which are moved by computer control. For instance, support posts go up and down to maintain an irregular member on its center line. Maintaining the center line of the irregular member as it is rotated is an important aspect of the present invention. As the irregular member changes shape along its length each support post is programmed relative to a part profile to support and make contact with the irregular member.

An alternative support post embodiment, referred to as a load-based post is shown in FIGS. 5 and 6. It includes a post base and carriage 52 and a guided sled 55 moving up and down relative to carriage 52. The load-based support post includes an air cylinder 56 with a pressure regulator to control the output force and move the sled up and down vertically in a similar manner to the position-based support post.

In the system embodiment of FIG. 1, there are four position-based support posts 22, 24, 26, and 28 along the thinner portion of the irregular member, while a load-based support post 30 is shown closer to the fixed rotation assembly where the member is thicker.

Figure 7:
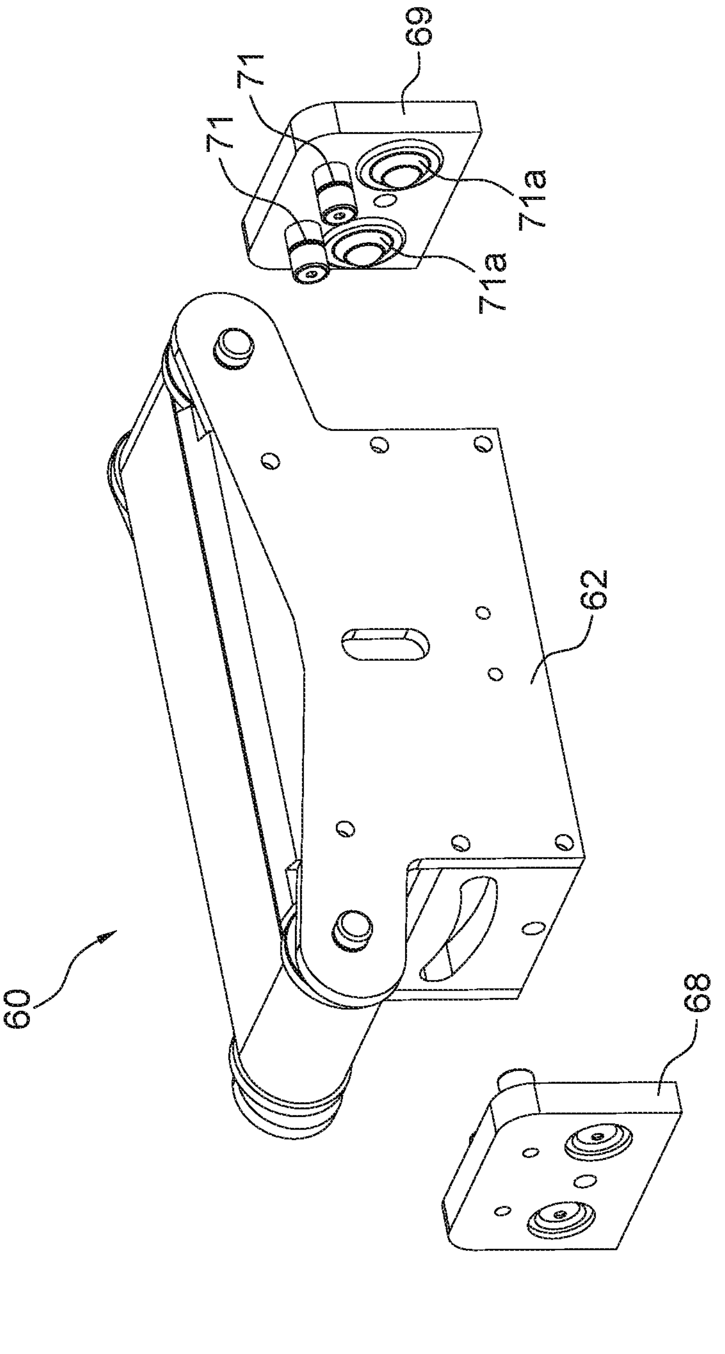
FIG. 7 is a perspective view of the pivoting head belt assembly portion of the support posts of FIGS. 2-6.
Figure 8:
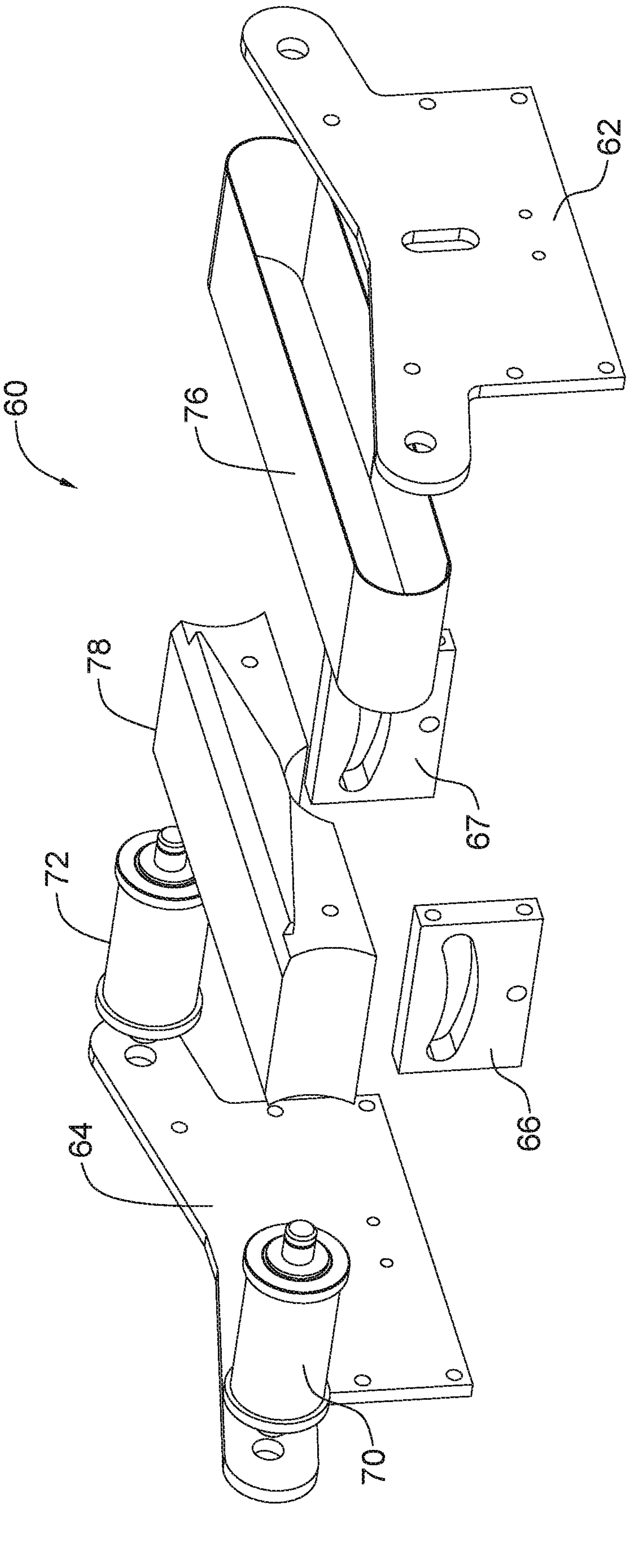
FIG. 8 is an exploded view of the head belt assembly of FIG. 7.

The position-based support posts and the load-based support posts both include a pivoting head/belt assembly 60 shown in FIGS. 7 and 8. The head/belt assembly includes a front plate 62 and a spaced apart rear plate 64. The front and rear plates are held together by curved slot blocks 66 and 67 which are supported by cam follower/ball transfer support assemblies 68 and 69, which each include cam follower members 71 and ball transfer elements 71*a* in the embodiment shown. The four can follower members provide vertical support and permit +/−10° of pivot of the belt assembly, while the four ball transfer members prevent side to side movement of the belt. Mounted at opposing upper ends between the front and rear plates 60 and 62 are belt rollers 70 and 72. Positioned around the rollers 70 and 72 is a low friction fabric belt 76. A belt support element 78 is positioned to assist in support of the belt as it contacts the irregular member.

Figure 9A:
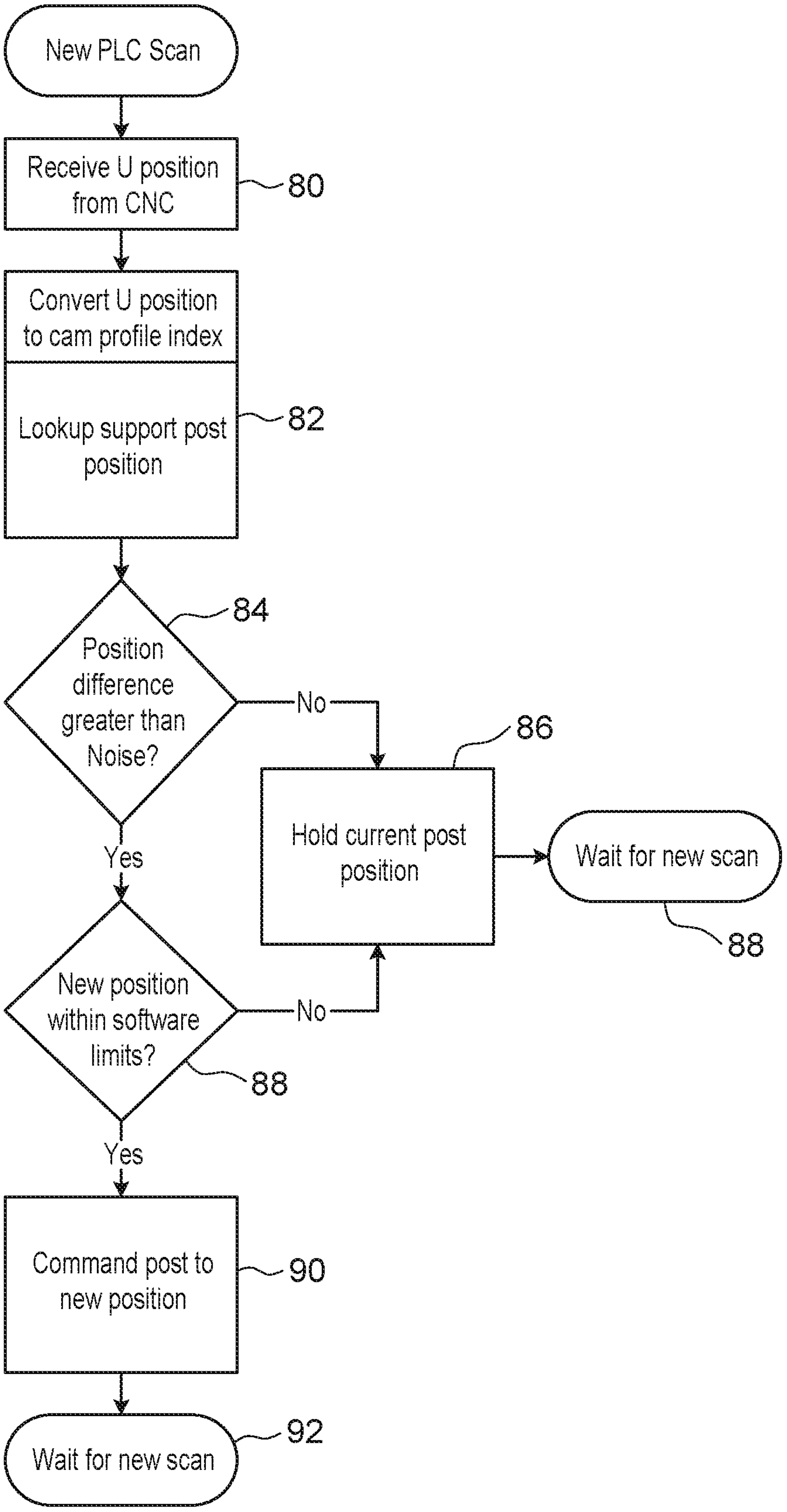
FIG. 9 is a flow chart for the control system to determine the vertical position of the support posts along the length of the long element.
Figure 9B:
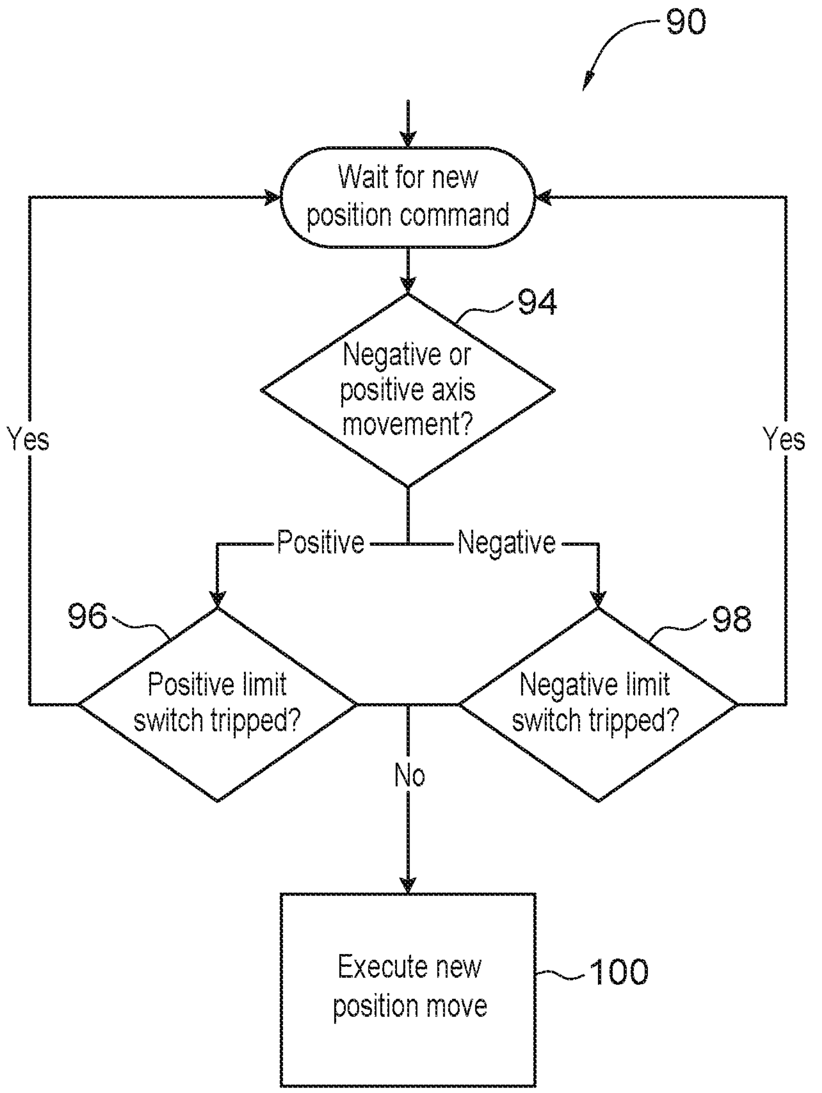

Software is used to determine the vertical position of each support post. A flow chart for the control software is shown in FIG. 9 and explained below. Typically, location of support posts every 300 mm is sufficient to provide adequate support for irregular members. Again, this distance can be changed. Typically, a sag or distortion of 2 mm between successive support post locations is acceptable to permit the use of an AFP machine. In operation of the control system a table of post positions is produced. Each support post has a profile look up table. The profile table is acquired by rotating virtually the 3D part model and obtaining measurements which are stored in software. In the present arrangement, the table uses 3600 measurements for each rotation, corresponding to every 0.1 degree of rotation about the longitudinal axis of the irregular member from 0.0 degrees to 360.0 degrees. In the process, the following steps are repeated sequentially as long as the CNC and PLC portions of the control system are running.

In general outline, the CNC sends the current longitudinal axis position in degrees to a PLC. The PLC truncates the position into tenths of a degree for use in the profile table for each post position. The PLC drives the actuators for each post in sequence along the 3D model, positioning the support posts for appropriate support such as shown in FIG. 1. Typically, the posts are located at 300 mm intervals, as indicated above, but this could be changed, depending on the configuration of the irregular member.

A flow chart for the control software for support post control is shown in FIG. 9. Referring now to FIG. 9, for each new PLC scan position is received from the CNC in degrees, at 80. The longitudinal position is then converted to a cam profile table which is specific to the member and the particular post location, at 82. The position is multiplied by 10 and then truncated providing tenths of a degree as an integer. The integer is now the index used to get a new position for each post. The software then evaluates the vertical position of the post against a noise level produced by the post motor encoders, at 84. If the post position difference is less than system noise, the current vertical position is maintained, at 86, and the software waits for a new scan, at 88. If the difference is greater than the system noise, e.g., 0.002 mm, then it is determined if the new position is within the software limits, at 90, to ensure that the system will not get close to the hard stop of the activators. The new vertical position is then produced. The system then waits for a new scan, at 92.

When there is a command for a new position, it is first determined whether the post movement will be positive (away from the member) or negative (toward the member), at 94. Limit switches for both positive at 96 and negative at 98 are reviewed so they will trip before a hard stop is reached. If not tripped, the actuator will move the post, at 100.

The above control process is repeated for each determined location along the part, for instance, every 300 mm. After all the control information is provided for each of the determined positions along the length of the member for control of each of the vertical posts as the member rotates, maintaining the longitudinal axis of the member stable during rotation of the member. With the above arrangement, AFP processing can be accomplished by a conventional AFP head laying down fabric. Typically, the fabric is laid down in swaths of 3.125 mm-25.4 mm, as indicated above. Each subsequent swath must land perfectly adjacent to the previous swath. The present invention permits this accurate AFP processing using a conventional AFP machine 90 as shown in FIG. 1.

The AFP head lays down layers on the top surface of the previous layers of 0, 90 plus or minus 45 degrees to provide the member the desired structural integrity. The control system shown in FIG. 9 also operates to accommodate the increasing dimensions of the part as fabric is laid down by the AFP processing system, i.e., it recognizes via successive scans the increasing cross-sectional dimensions of the irregular member caused by the AFP processing.

More specifically, in general, a support post has at least one profile. It could have more if the part is not cylindrical, 7 profiles for each support post in one example. The multiplicity of cam profiles for each post is necessary because the part geometry does not change uniformly as layers of carbon fibers are applied to the tool. Therefore, throughout the building of the part, a single support post will use different cam profiles to support the intermediate shape of the part.

The cam profiles are all generated the same way, by virtually rotating the 3D part model and obtaining measurements using the 3D design software explained above. At first, the geometry of the bare member is used to generate the initial cam profile. Then, incremental layers of carbon fiber are virtually added to the member. In one example, after roughly 2 mm of carbon fiber has been applied to the member at the specified support post position, then another cam profile is generated by rotating the 3D model, obtaining new measurements. This process of incrementally layering carbon fiber and generating and using a new updated cam profile is repeated until the last cam profile is sufficient to maintain centerline for the tool for the remainder of the AFP process. Again, in one example, the next set up profile would be used for the first 30 plys, another set of profiles after 150 plys, etc.

Figure 10:
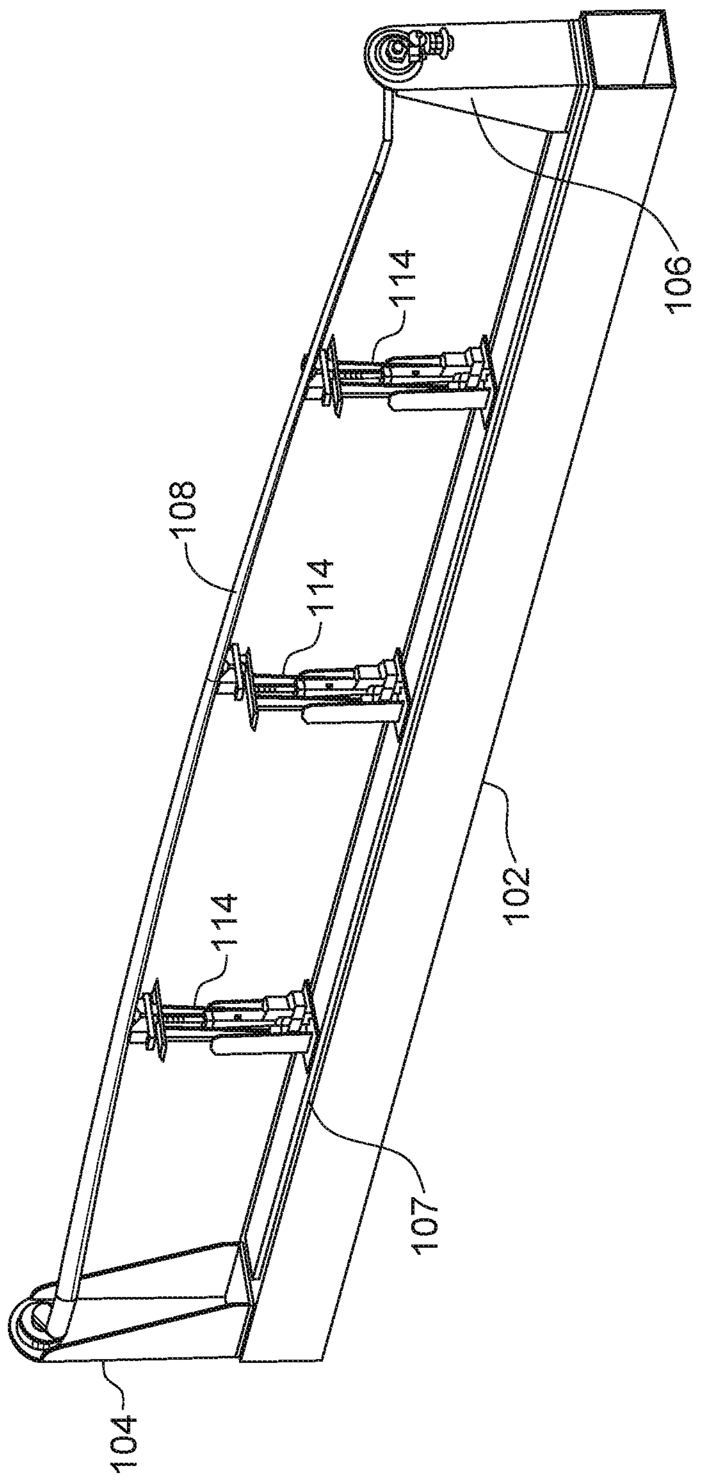
FIG. 10 is a perspective view of a second embodiment of the invention.
Figure 11:
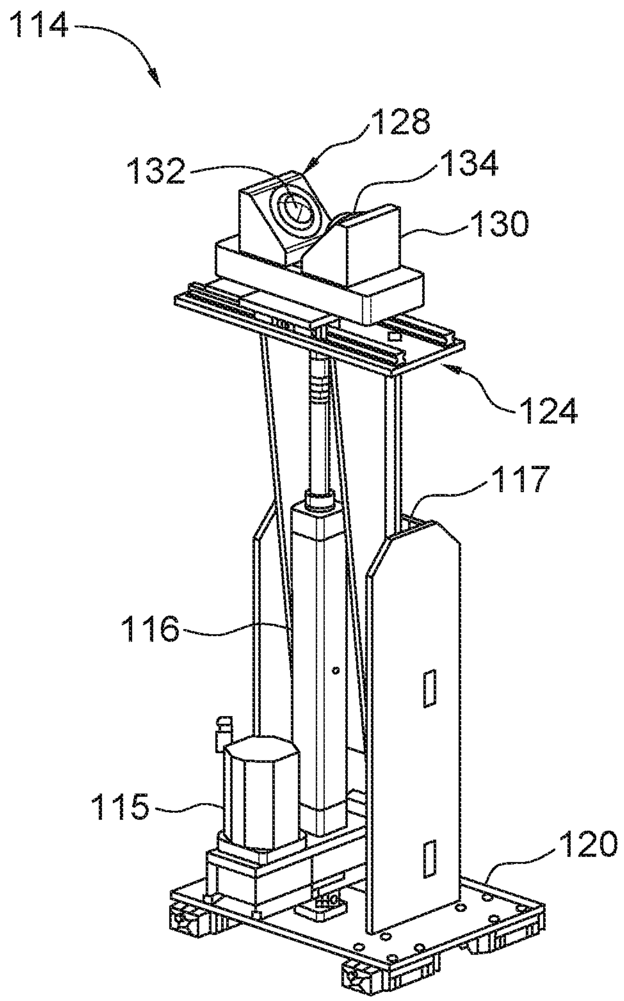
FIG. 11 is a perspective view of a support post assembly for the embodiment of FIG. 10.

FIGS. 10-13 illustrate a second embodiment of the invention which supports bent or curved members, such as struts, for AFP fabrication. The strut has a particular structure, with a tapered OD (outside diameter) from one end to the other. FIG. 10 illustrates a base support member 102 with opposing rotator/attachment assemblies 104 and 106 positioned at opposing ends of the base support member 102. Rotator assembly 106 is movable along linear rails 107 for different length struts. A curved strut 108 is shown in place between the rotator/attachment assemblies with the larger diameter end attached to rotator/attachment assembly 104 and the smaller diameter end attached to the other rotator/attachment assembly 106. The curved strut 108 has a regular taper from one end to the other. In operation, the strut is rotated for processing by an AFP machine, laying down fiber swaths along the length thereof. The carrier structure for the curved strut is shown in FIG. 11. Each carrier structure includes a post assembly 114 which is part of a carrier 120. The carrier 120 is moveable on the linear rails 107 to accommodate the strut geometry along base member 102. The post assembly, shown in FIG. 11, includes a servo motor 115 and a base screw activator 116, for vertical travel on post linear rails 117. At the top of end post assembly 114 is horizontal platform 124. Attached to platform 124 are a pair of opposing strut support members 128 and 130. The strut support members 128 and 130 have angled surfaces which converge, forming a V-shaped opening into which the curved strut is positioned. On the angled surfaces are ball transfer elements 132 and 134 which the curved strut contacts.

Figure 12:
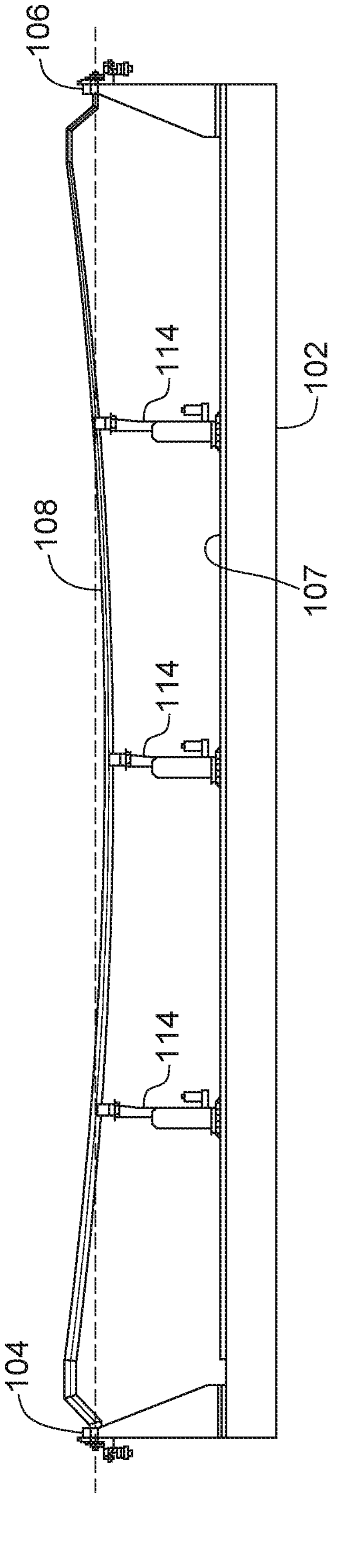
FIG. 12 is an elevational view of the embodiment of FIG. 10 where the long element is at a 0° position.
Figure 13:
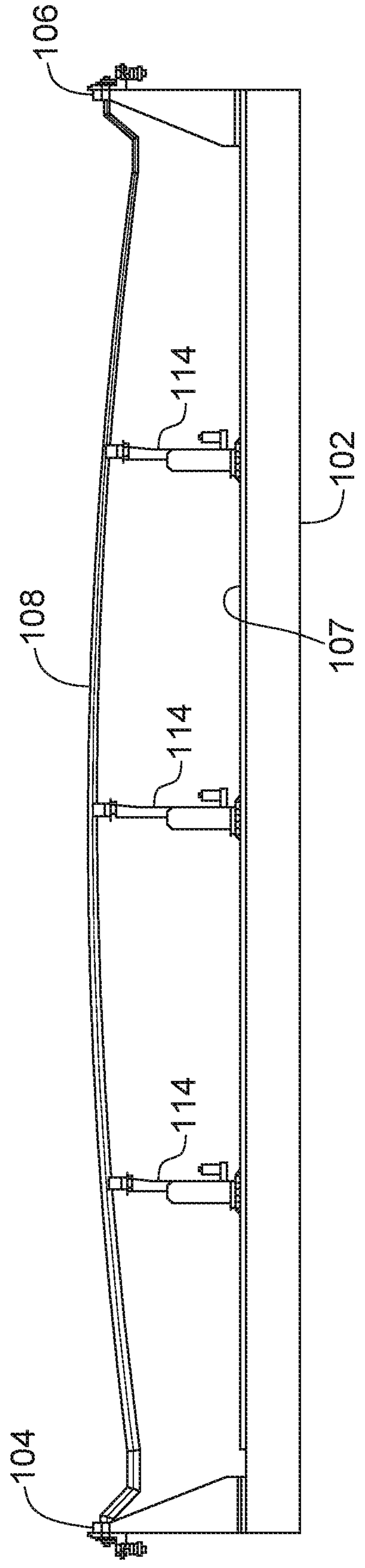
FIG. 13 is an elevational view of the long element of FIG. 10 at a 180° position.

Post assembly 114 is movably supported on carrier 102 as indicated above, with 200 mm of horizontal travel and 200 mm of vertical travel, or more travel if needed, to accommodate the change in position of the strut as the strut is rotated for AFP processing. The horizontal and vertical travel of the post assembly is produced by a control system which moves each of the support posts as the strut is rotated. The rotation of the strut will describe a circle with the diameter of the circle depending upon the position of each particular post along the length of the strut. Since the curvature of the strut is known, the control system can control the movement of each of the post assemblies as the strut is rotated. This arrangement has the advantage of good structural support as the strut is rotated, accommodating the pressure produced by the AFP processing system, so that the deflection and resulting sag is very low. The deflection is less than 2 mm, when a processing load is applied to the strut. FIGS. 12 and 13 show 0° and 180° rotation positions, respectively, for a typical strut during AFP processing. AFP processing machines can thus be used with irregular and curved parts, thus saving substantial time while providing required accuracy for effective laying down AFP swaths.

Figure 14:
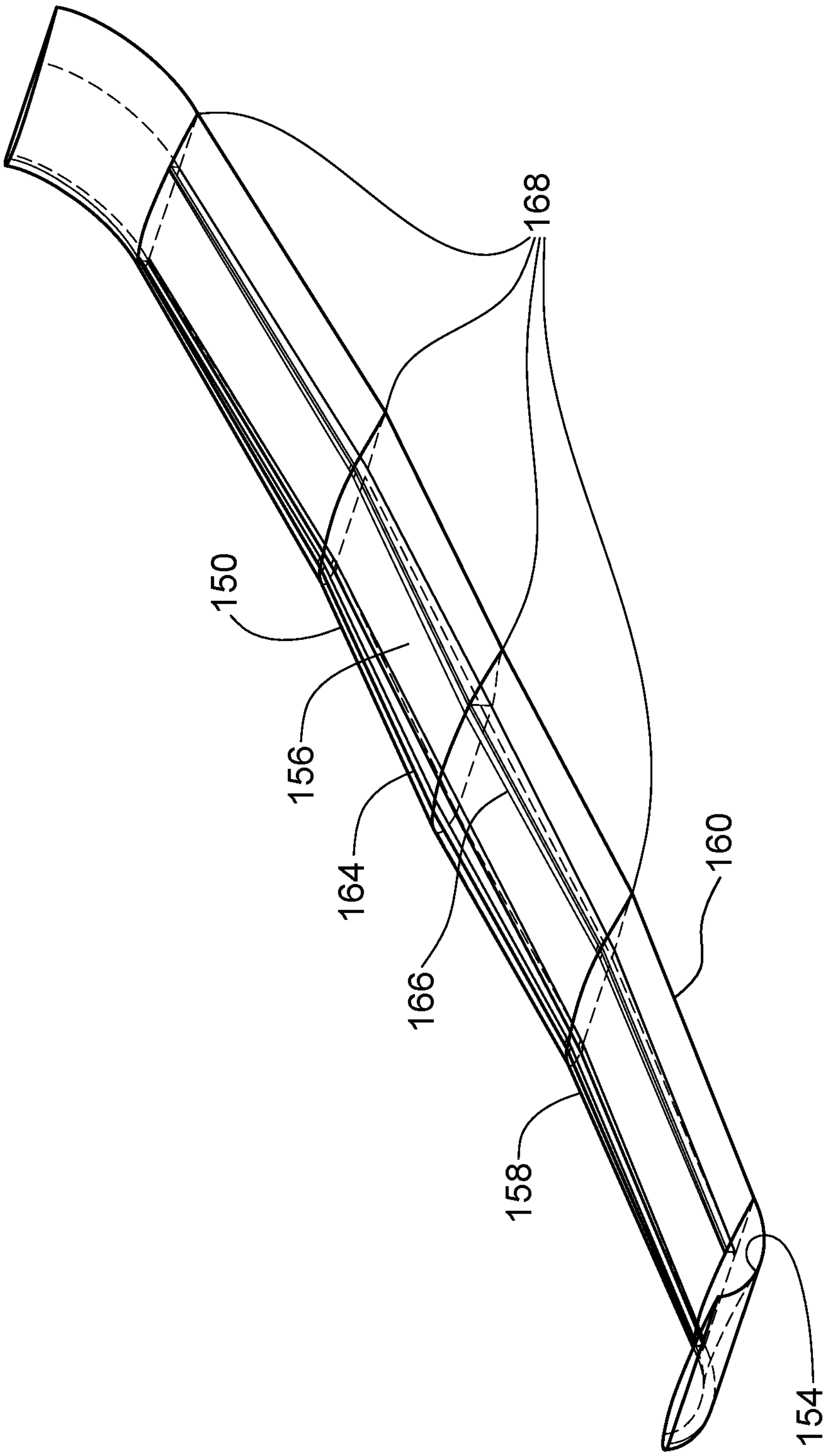
Figure 15:
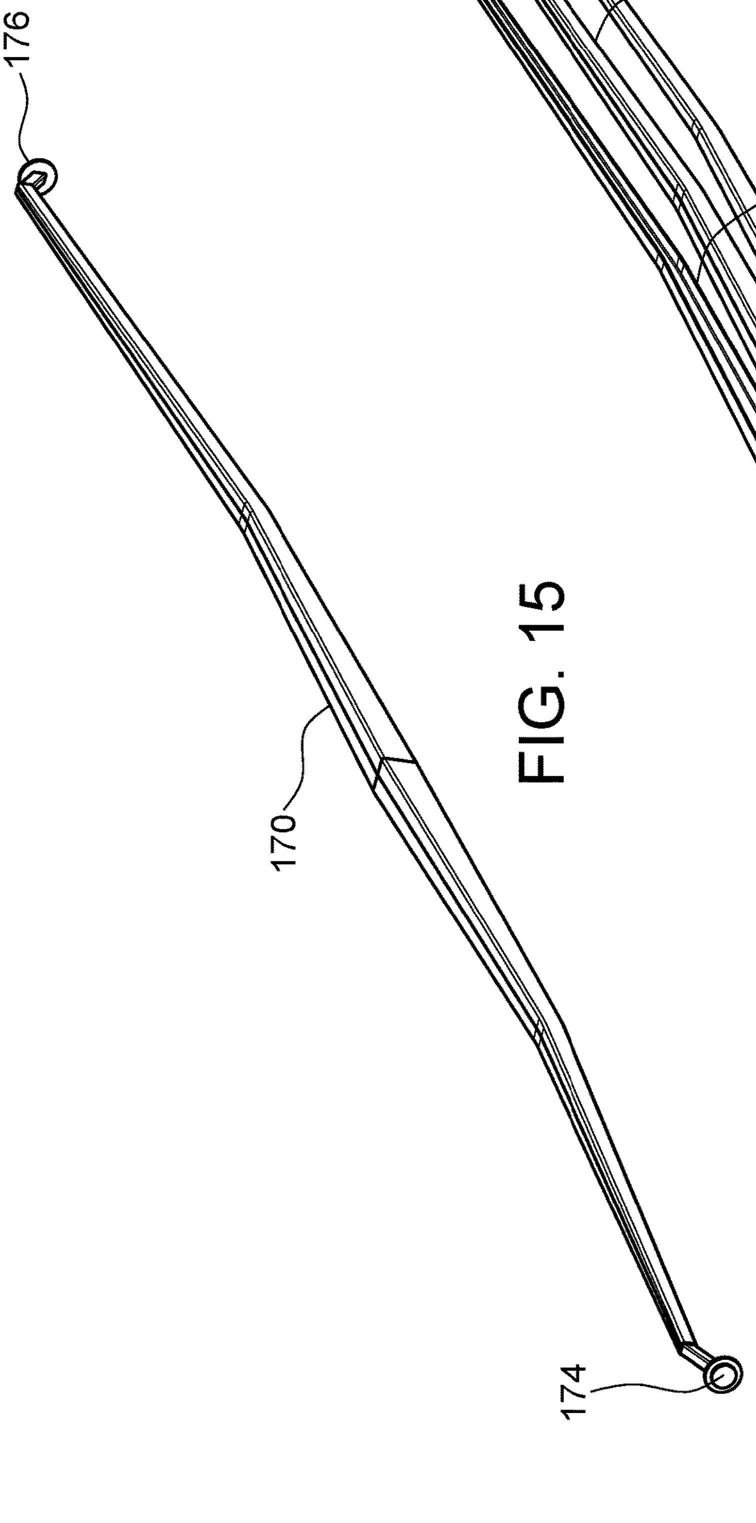
FIG. 15 is perspective view of end connections for two connected wing spar members on a single rotating mandrel.
Figure 16:
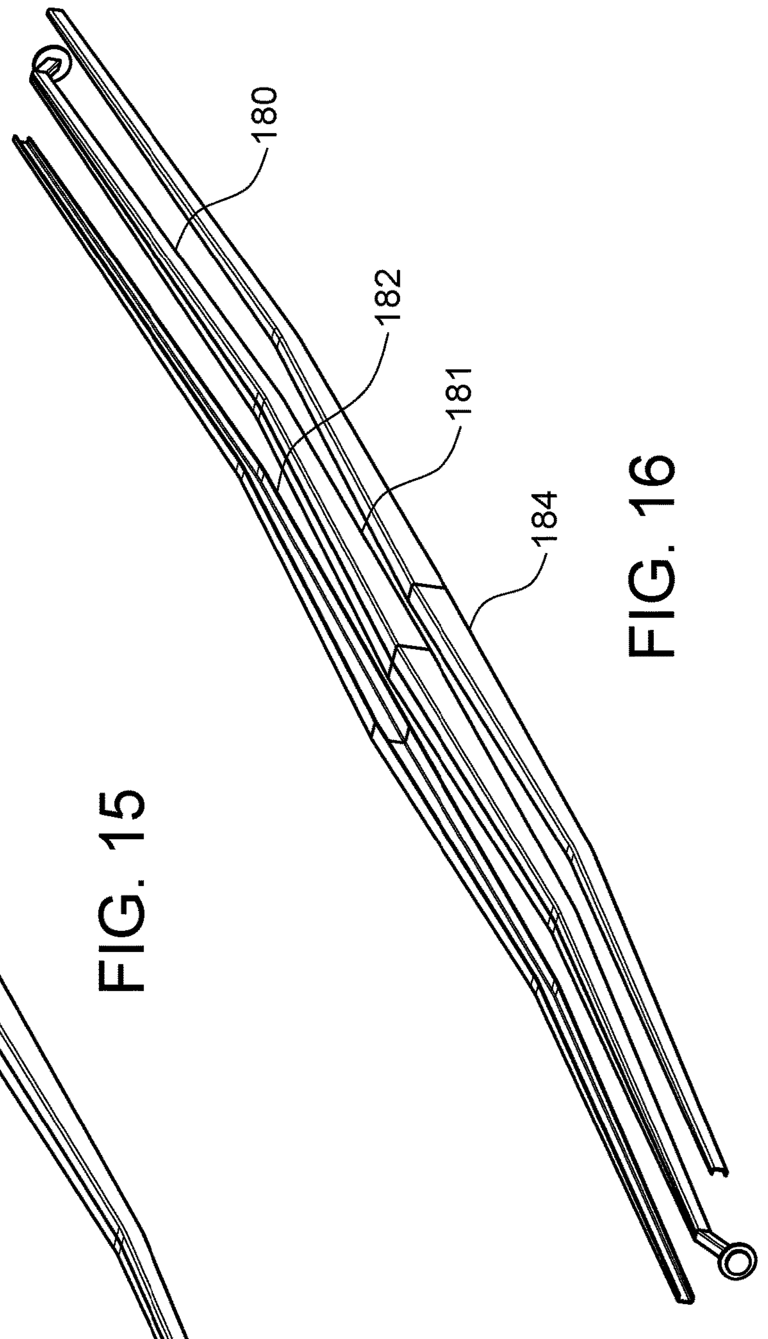
FIG. 16 is a perspective view of the two-spar arrangement of FIG. 14 with associated carbon fiber layups.

FIGS. 14-17 show an embodiment for use with wing spars. FIG. 14 is a perspective view of a wing spar 150 and wing. FIG. 14 shows an upper wing skin 154 and a lower wing skin 156. The leading edge of the wing is 158, the trailing edge is 160. The leading edge of the spar is shown at 164, the trailing edge at 166. Wing ribs are shown at 168. FIG. 15 shows a two-spar combination, the two spars positioned end to end on a rotating mandrel 170 with mounting interfaces 174 and 176 at the respective ends thereof. FIG. 16 shows the two-spar combination 180 with a carbon fiber layup 182 for a first spar and a carbon fiber layup 184, for a second spar.

Figure 17:
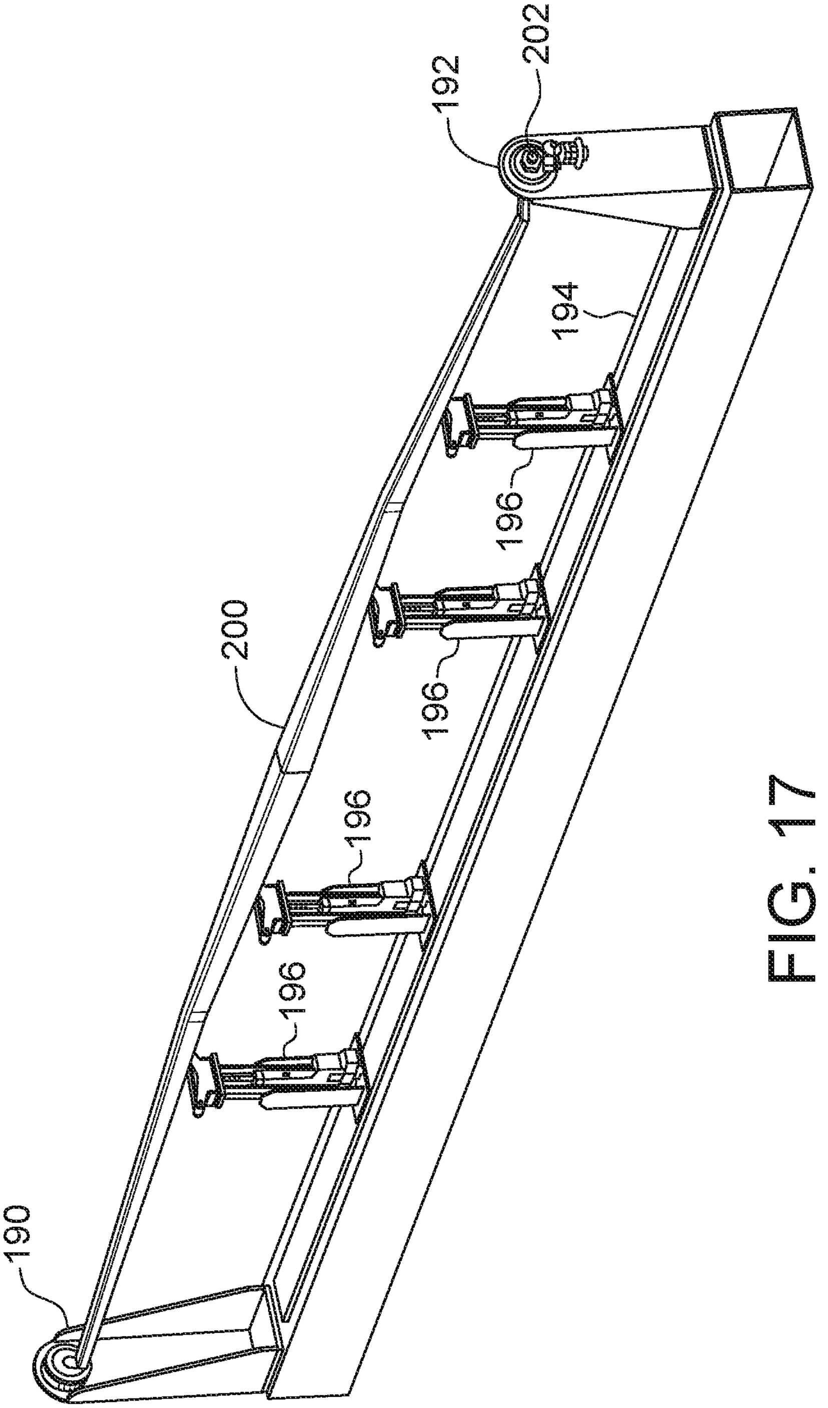
FIG. 17 is a support arrangement for the two spar rotating mandrel of FIG. 14.

The mechanism for AFP wrap-up with the carbon fiber is shown in FIG. 17. It includes a fixed rotator 190 and an adjustable rotator 192 which can move toward and away from the fixed rotator 190 to accommodate different lengths of spars. Rotator 192 is mounted on linear rails 194. Support posts 196 are positioned along the length of the rotator assembly for support of a spar mandrel 200. Support posts are also mounted on the linear rails so that they can be positioned as required for the spar geometry. The adjustable rotator has a reduction gearhead 202 to rotate the spar mandrel as required. The spar is rotated eccentrically to minimize the vertical travel of the support posts. The support posts 196 in FIG. 17 include four support posts but the number of support posts can vary. The support posts are similar to that shown in one other embodiments, with the spar mandrels being supported on the fabric belt portion of the support post rollers. In operation, the spar mandrel is rotated under computer control as the fabric is positioned on the spar mandrel.

Although one or more preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A support system for manufacture of a structural member having an irregular cross-section using an automated fiber placement (AFP) machine, the support system comprising:
- a base support member;
- a first rotational support assembly configured to rotatably support a first end of an irregular member, the first rotational support assembly being movable along the base support member for accommodating irregular members of various lengths;
- a second rotational support assembly coupled to the base support member and configured to rotatably support an opposing end of the irregular member;
- a driving assembly configured to rotate the irregular member wherein the first and second rotational support assemblies are configured to maintain a selected longitudinal axis of rotation for the irregular member during rotation thereof;
- at least one support assembly disposed between the first and second rotational support assemblies, each support assembly having:
  - a vertically movable portion that has a rigid vertical-support portion that is dynamically controlled for consistent and precise displacement along a vertical displacement path, and
  - a horizontal translation member disposed vertically adjacent to the rigid vertical-support portion and having a low resistance to horizontal movement,
  - the at least one support assembly supporting the irregular member against vertical deflection resulting from downward force of the AFP machine through a vertical and horizontal range of motion corresponding to a rotational path of a correspondingly located portion of the irregular member as the portion of the irregular member rotates around the longitudinal axis of the irregular member as it rotates; and
- a control assembly programmably configured to control the movement of the vertically movable portion of each at least one support assembly to provide support along a respective, precisely predetermined support path having a variable radius about the longitudinal axis to maintain precise contact with the irregular member during rotation of the irregular member about the longitudinal axis for operation of an AFP machine in placing fiber on the irregular member.

2. The system of claim 1, including a tensioning assembly configured to apply tension to the first rotational support assembly and the irregular member during operation.

3. The system of claim 2, wherein the tensioning assembly applies tension on the irregular member of at least 100N.

4. The system of claim 1, including a plurality of the support assemblies for the irregular member positioned at spaced intervals along the base support member.

5. The system of claim 4, wherein the plurality of support assemblies are positioned sufficiently close to each other that there is less than 2 mm of sag of the irregular member between the spaced support assemblies during operation of the AFP machine.

6. The system of claim 4, wherein the plurality of support assemblies are positioned at 300 mm intervals or greater.

7. The system of claim 4, wherein the support assemblies are movable along the base support member.

8. The system of claim 1, wherein the opposing end of the irregular member is thin and the first end of the irregular member is larger than the opposing end.

9. The system of claim 1, wherein the longitudinal axis of the irregular member is fixed as it rotates during processing.

10. The system of claim 1, wherein each support assembly includes two spaced cylindrical support members and a belt extending therebetween which in operation contacts the irregular member.

11. The system of claim 1, further comprising, for each support assembly, one or more ball screw actuators and one or more servo motors configured to receive instructions from the control assembly and to extend and retract the vertically movable portion of the support assembly in the vertical direction.

12. The system of claim 1, wherein the control assembly controls vertical movement of each of the at least one support assembly according to a support-position specific series of computer aided profiles obtained by rotating a virtual model of the irregular member and obtaining measurements of the rotational path corresponding to a position of the support assembly with respect to the irregular member.

13. The system of claim 12, wherein the vertical movement of each support assembly is controlled by the control assembly in accord with a respectively utilized computer aided profiles from the series of the computer aided profiles, each computer aided profile corresponding to a respective amount of fiber material progressively layered on the irregular member by the AFP machine.

14. A support system for manufacture of a curved member using an automated fiber placement (AFP) processing machine for, the support system comprising:
- a base support assembly;
- a first rotational support assembly coupled to the base support assembly and configured to couple with and rotatably support a first end of the curved member;
- a second rotational support assembly coupled to the base support assembly and configured to rotatably support an opposing end of the curved member, wherein at least one of the first and second rotational assemblies is securably movable on the base support assembly to accommodate curved members of various lengths;
- a driving assembly configured to rotate the curved member;
- a plurality of supporting assemblies disposed between the first and second rotational support assemblies and configured to contact and support the curved member as it rotates, wherein the supporting assemblies each include:
  - a carrier member connected to the base support assembly, and a post assembly configured to move vertically and horizontally to maintain support for the curved member as it is rotated, the post assembly configured to provide consistent and rigid support against vertical deflection of the curved member and low-resistance horizontal support for the curved member at the corresponding portion of the curved member as the corresponding portions travel about a rotational axis of the curved member; and a control system configured to control the movement of each post assembly according to a respective series of one or more computer aided profiles, the computer aided profiles in each series being generated for a respective post assembly position along the base support assembly and describing a series of precise paths of the post assembly for a corresponding portion of the curved member as the corresponding portion of the curved member rotates about the rotational axis, the movement configured to correspond with a position of corresponding portions of the curved member based on a position of the carrier member along the length of the base support member, the support system supporting the curved member against deflection by forces from the operation of an AFP machine in placing fiber on the curved member.

15. The system of claim 14, wherein the curved member is a strut.

16. The system of claim 14, wherein the post assembly includes a platform and two members positioned thereon having respectively converging angled surfaces for support of the curved member.

17. The system of claim 16, wherein an angle of support for the converging angled surfaces is 45°, plus or minus 10°.

18. The system of claim 16, wherein the angled surfaces each include a ball transfer for supporting the curved member.

19. The system of claim 14, wherein the post assembly is movable 200 mm in both horizontal and vertical directions.

20. A support system for manufacture of a wing spar member, using an automated fiber placement (AFP) processing machine, the support system comprising:

a base support assembly;

a first rotational support assembly coupled to the base support assembly and configured to rotatably support a first end of the wing spar member;

a second rotational support assembly coupled to the base support assembly opposite the first rotational support assembly and configured to rotatably support an opposing end of the wing spar member, wherein at least one of the first and second rotational assemblies is movable on the base support assembly to accommodate wing spar members of various lengths;

a driving assembly configured to rotate the wing spar member;

a plurality of supporting assemblies disposed along the base support assembly, each supporting assembly in the plurality of supporting assemblies configured to contact and support the wing spar member at a respective support position as it rotates about a longitudinal axis of rotation, wherein each of the supporting assemblies includes a support platform that is configured to move vertically, providing rigid and precisely located support against vertical deflection of the wing spar as the wing spar rotates around the axis of rotation, and to move transversely, providing low-resistance horizontal support of the wing spar, based on rotational position of the wing spar member to maintain support for the wing spar member as it is rotated; and a control system configured to control the movement of each of the supporting assemblies according to a respectively series of one or more computer aided profiles, the computer aided profiles in each series having been generated for a respective supporting assembly position along the base support assembly and describing a series of precise paths of the post assembly for a corresponding portion of the curved member as the corresponding portion of the curved member rotates about the longitudinal axis of rotation, the vertical movement controlled depending upon a predetermined position of the supporting assemblies along the length of the base support member and the rotational movement of the wing spar member at the supporting assembly position along the base support member, whereon the AFP processing machine places carbon fiber on the wing spar member as the wing spar member is rotated.

* * * * *